(12) United States Patent
Liebhold

(10) Patent No.: US 7,456,907 B2
(45) Date of Patent: Nov. 25, 2008

(54) METHOD AND APPARATUS FOR SHARING CONTROL SIGNALS IN A TELEVISION APPARATUS SUPPORTING MULTI-WINDOW CAPABILITIES

(75) Inventor: Valerie Sacrez Liebhold, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 122 days.

(21) Appl. No.: 10/587,288

(22) PCT Filed: Jan. 26, 2004

(86) PCT No.: PCT/US2004/001866

§ 371 (c)(1),
(2), (4) Date: Jul. 25, 2006

(87) PCT Pub. No.: WO2005/081660

PCT Pub. Date: Sep. 9, 2005

(65) Prior Publication Data

US 2007/0139556 A1    Jun. 21, 2007

(51) Int. Cl.
H04N 5/44    (2006.01)
(52) U.S. Cl. .................. 348/734; 348/565; 348/564
(58) Field of Classification Search ............... 348/565, 348/563–564, 569, 731, 725, 734, 555–556; 725/38, 57, 139, 151; 340/825.69, 825.72, 340/825.25; H04N 5/44
See application file for complete search history.

(56) References Cited

U.S. PATENT DOCUMENTS

| 5,398,074 | A | 3/1995 | Duffield et al. |
| 6,334,217 | B1 | 12/2001 | Kim |
| 6,373,500 | B1 | 4/2002 | Daniels |
| 6,449,018 | B1 | 9/2002 | Yokoyama |
| 6,473,130 | B1 | 10/2002 | Kim |
| 6,590,618 | B1 | 7/2003 | Park et al. |
| 6,795,130 | B2 * | 9/2004 | Shibamiya ................. 348/734 |
| 7,206,029 | B2 * | 4/2007 | Cohen-Solal ............... 348/565 |
| 7,281,259 | B2 * | 10/2007 | Takagi et al. .................. 725/38 |

OTHER PUBLICATIONS

Search Report dtd. Aug. 25, 2004.

* cited by examiner

*Primary Examiner*—Trang U Tran
(74) *Attorney, Agent, or Firm*—Joseph J. Laks; Robert D. Shedd; Reitseng Lin

(57) ABSTRACT

A television apparatus according to the principles of the invention supports two or more display windows but accepts channel changing control signals for changing channels in all windows only from one set of keys from a remote control. The television apparatus includes at least two tuners with respective windows and a processor for receiving control signals for instructing the two tuners to change channels. When the processor receives a first control signal, the processor displays and selects a first window for future channel changing. If the first window has been displayed when the first control signal is received, the processor selects a window no currently selected for channel changing. Advantageously, no additional key in the remote is used to share the same set of channel changing keys among multiple windows supported by the television apparatus.

19 Claims, 4 Drawing Sheets

METHOD AND APPARATUS FOR SHARING CONTROL SIGNALS IN A TELEVISION APPARATUS SUPPORTING MULTI-WINDOW CAPABILITIES

This application claims the benefit, under 35 U.S.C. § 365 of International Application PCT/US2004/001866, filed Jan. 26, 2004, which was published in accordance with PCT Article 21(2) on Sep. 9, 2005 in English.

TECHNICAL FIELD OF INVENTION

This invention relates to the field of television and, more particularly, to sharing control signals among windows of a television supporting multi-window capabilities.

BACKGROUND ART

Many television sets provide multi-window capabilities that allow more than one signal to be displayed at once on the television screen. The multi-window capabilities include picture-in-picture (PIP), picture-and-picture (PAP), and picture-outside-picture (POP) capabilities. The PIP capability allows more than one signal to be displayed at once but only one signal is displayed on the main display area of the television screen at any one time. Others are displayed in secondary display areas. The PAP capability allows more than one signal to be displayed on the main display area. On the other hand, the POP capability allows one signal to be displayed on the main display area (4:3) of a wide-screen (16:9) television, and others on the unused areas around the main display area. As used herein, each display area is called a display window or simply a window.

Each window normally requires a different set of channel changing keys for changing the channel displayed in that window. For example, a television apparatus supporting PIP capabilities would require a remote control having a set of channel changing keys for the main window and a different set for the PIP window. Furthermore, even though some television sets allow PIP windows to share a set of number keys with main windows, a key, other than the PIP key for displaying PIP windows, must be dedicated to toggle the channel control between the main windows and the PIP windows. Thus, in either approach, one or more additional keys are needed in order to change channel in PIP windows.

It is well known that new capabilities and functionalities such as electronic programming guides and Internet access have been incorporated into a television apparatus. These new capabilities and functionalities often require more control keys in a remote control. Thus, there is also a need to reduce the number of keys in a remote control to leave more space for incorporating these additional keys.

DISCLOSURE OF INVENTION

A television apparatus according to the principles of the invention supports two or more display windows sharing one set of channel changing control signals for changing channels, but using one remote control signal to invoke (display) one of the windows and to select one of the windows for channel changing.

The television apparatus includes at least two tuners for supplying television signals to respective windows and a processor for receiving control signals and for instructing the two tuners to change channels requested by a control signal. When the processor receives a first control signal, the processor displays a first window and selects the first window for channel changing, if the first window has not been displayed. If the first window has been displayed when the first control signal is received, the processor selects a window not currently selected for channel changing.

For example, the first control signal may be a signal generated by activating (such as pressing) a picture-in-picture (PIP) button (key) from a remote control, and a channel changing control signal may be a signal generated by pressing at least a channel number key in the remote control. In this example, if the PIP window has not been displayed when the processor receives the first control signal, the processor invokes the PIP window and simultaneously selects the PIP window for channel changing. If the PIP window has been displayed when the first control signal is received, the processor selects a window not currently selected for channel changing. As such, the PIP key can be used to invoke a PIP window and to select one of the windows for channel changing.

To provide a user a visual indication of which window has been selected for channel changing, the processor may highlight the selected window or include an icon inside the selected window.

MODES FOR CARRYING OUT THE INVENTION

Figure 1:
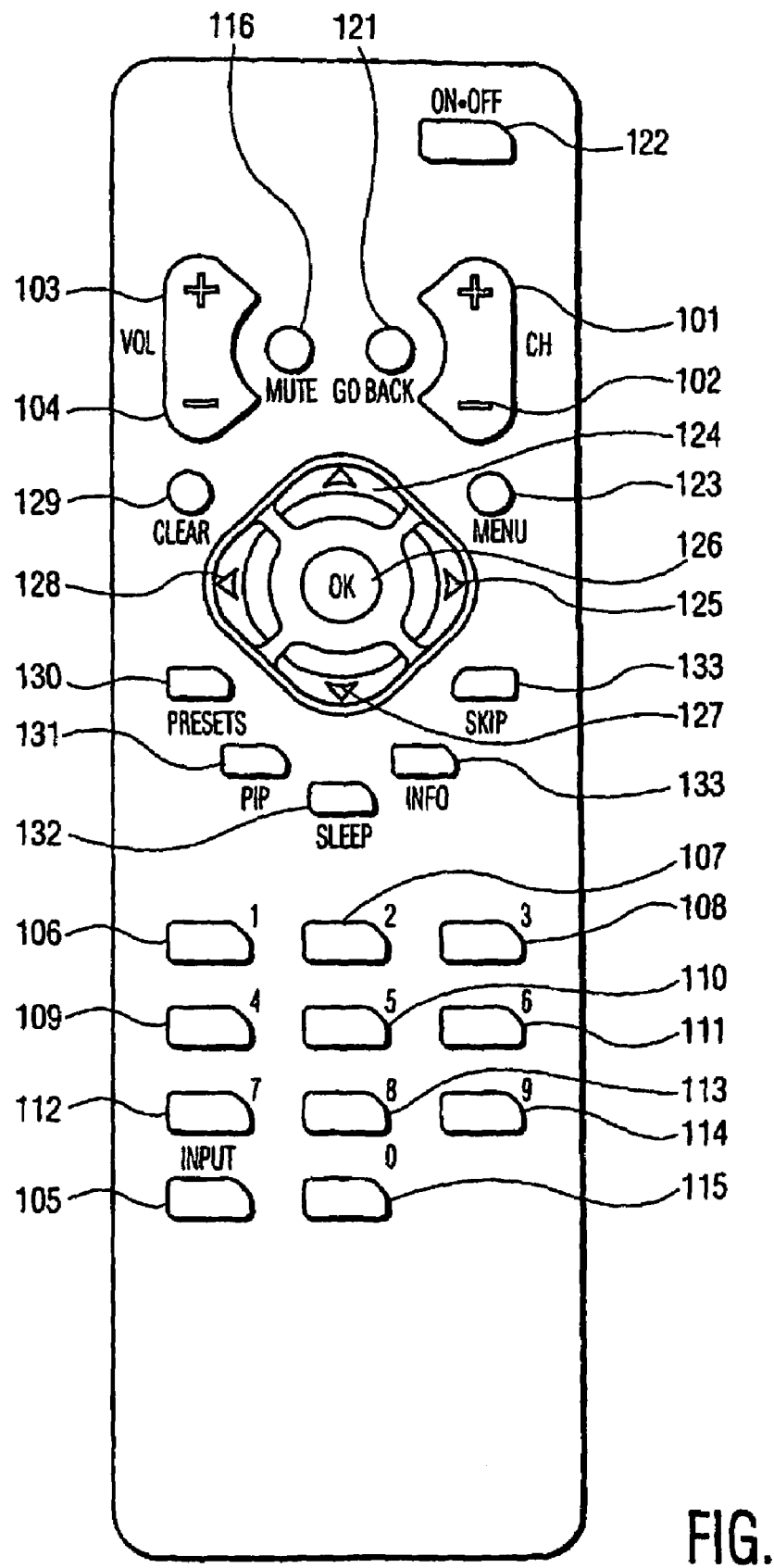
FIG. 1 illustrates a hand-held infrared remote control that can be used with a television apparatus according to the principles of the invention.

FIG. 1 illustrates a hand-held infrared remote control 100 adapted to function according to the present invention. The infrared remote control 100 illustratively includes channel up key 101, channel down key 102, volume up key 103, volume down key 104, channel number keys 106-115, mute key 116, commercial skip key 120, go-back key 121, and a power key 122. The remote control 100 also includes a picture-in-picture (PIP) key 131 for invoking (displaying) a PIP window and for selecting a window for channel changing. The infrared remote control 100 further comprises an infrared signal generator (not shown) for generating infrared control signals when keys are activated. When a user presses any of the keys 101-104 and 106-122 on the remote control 100 an appropriate user infrared control signal (not shown) is generated by the infrared generator and is transmitted to a controlled device, such as a television apparatus illustrated in FIG. 3. The controlled device, in turn, executes the control signal. The set of keys for channel changing in this illustration includes channel number keys 206-215, go-back key 221, channel up key 201, and channel down key 202. This set of channel changing keys is shared by each window in a television apparatus supporting multi-window capabilities. Of course, the channel changing keys are not limited to those included in this set, a key is considered a channel changing key if activating the key would cause a television apparatus to change channel.

Illustratively, the remote control 100 also includes other keys not necessary for understanding the principles of this invention: a menu key 123 for displaying a television setup menu, an input key 105 for selecting a video input, a sleep key 132 for adjusting a sleep timer, an information key 133 for displaying an on-screen display (OSD), keys (an up arrow key 124, a down arrow 127, a right arrow key 125, and a left arrow key 128) for navigating inside an OSD, an OK key to validate a selection in an OSD, and a clear key 129 for clearing an OSD. Other keys may be added for other functions, and the sharing of channel changing keys among windows may leave more room for incorporating these additional keys.

Figure 2:
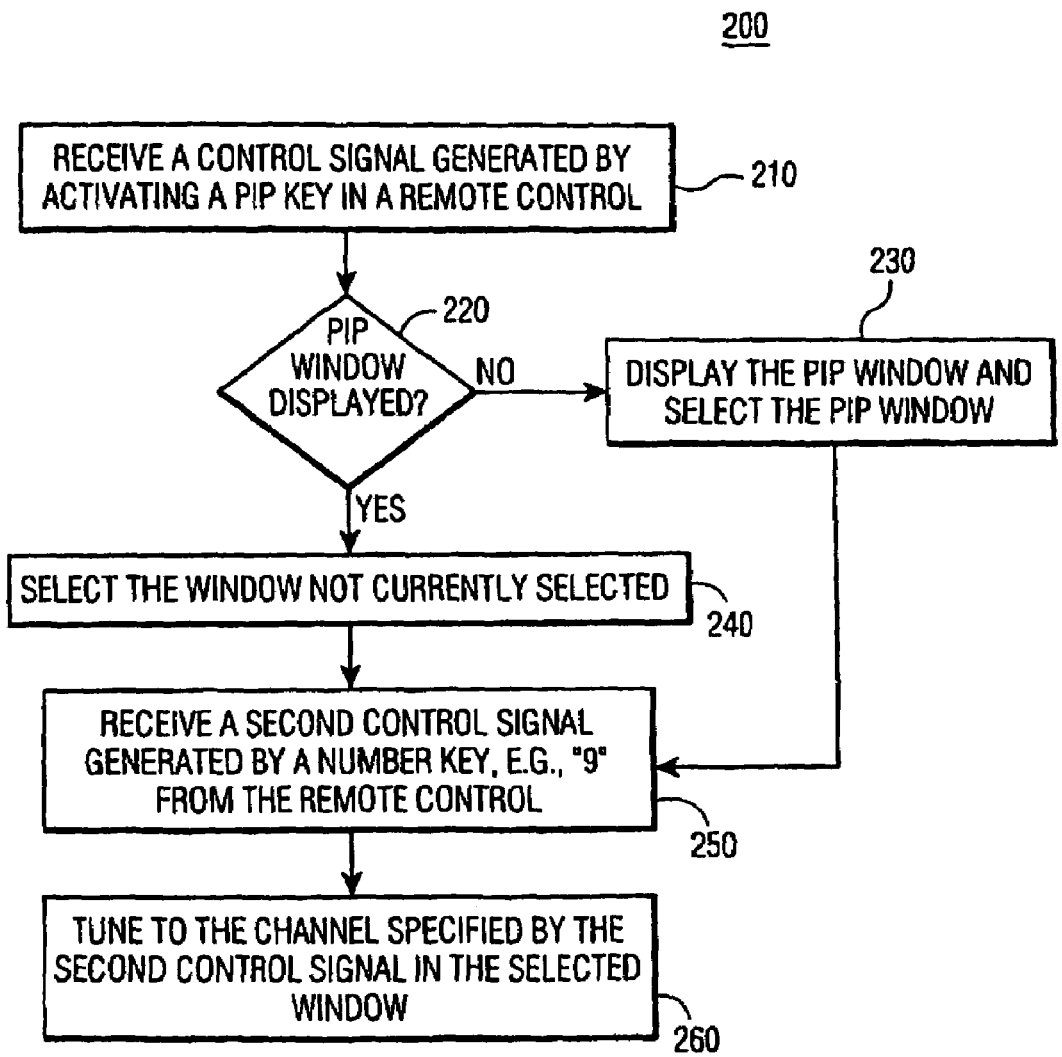
FIG. 2 illustrates a method using one key to display a PIP window and select one of the windows for channel changing according to the principles of the invention, so that one set of channel changing keys from a remote control can be shared by all windows.

FIG. 2 illustrates a method 200 using one key to display a PIP window in a television apparatus supporting PIP and select either the PIP window or a main window for channel changing according to the principles of the invention, so that both the PIP window and the main window can share the same set of channel changing keys. For illustration purposes, the remote control 100 is used in describing the method 200. At step 210, the television apparatus receives a first control signal generated by a user activating the PIP key 131 in the remote control 100 by, for example, pressing the PIP key 131. The television apparatus determines if a PIP window has been displayed at a decision block 220. If a PIP window has been displayed, the television apparatus at step 240 selects a window not currently selected for channel changing. For example, if the PIP window is currently selected, the television apparatus selects the main window. At step 250, the television apparatus receives a channel changing control signal, which can be a signal generated by pressing one or more channel number keys 206-215, the channel up key 201, the channel down key 202, or the go-back key 221. The television apparatus, at step 260, then tunes to the channel specified by the channel changing control signal for the selected window. When the television selects a window for channel changing, it may also highlight the window, so that a user can visually see which window has been selected.

If a PIP window has not been displayed at the decision block 220, the television apparatus proceeds to display a PIP window and simultaneously select the PIP window for future channel changing at step 230. The television apparatus then proceeds to receive a channel changing control signal at step 250 and tunes to the channel specified by the channel changing control signal for the PIP window at step 260. After the main window has been selected, if the television apparatus receives the first control signal again, the television apparatus removes the PIP window, i.e., the PIP window is not displayed.

Figure 3:
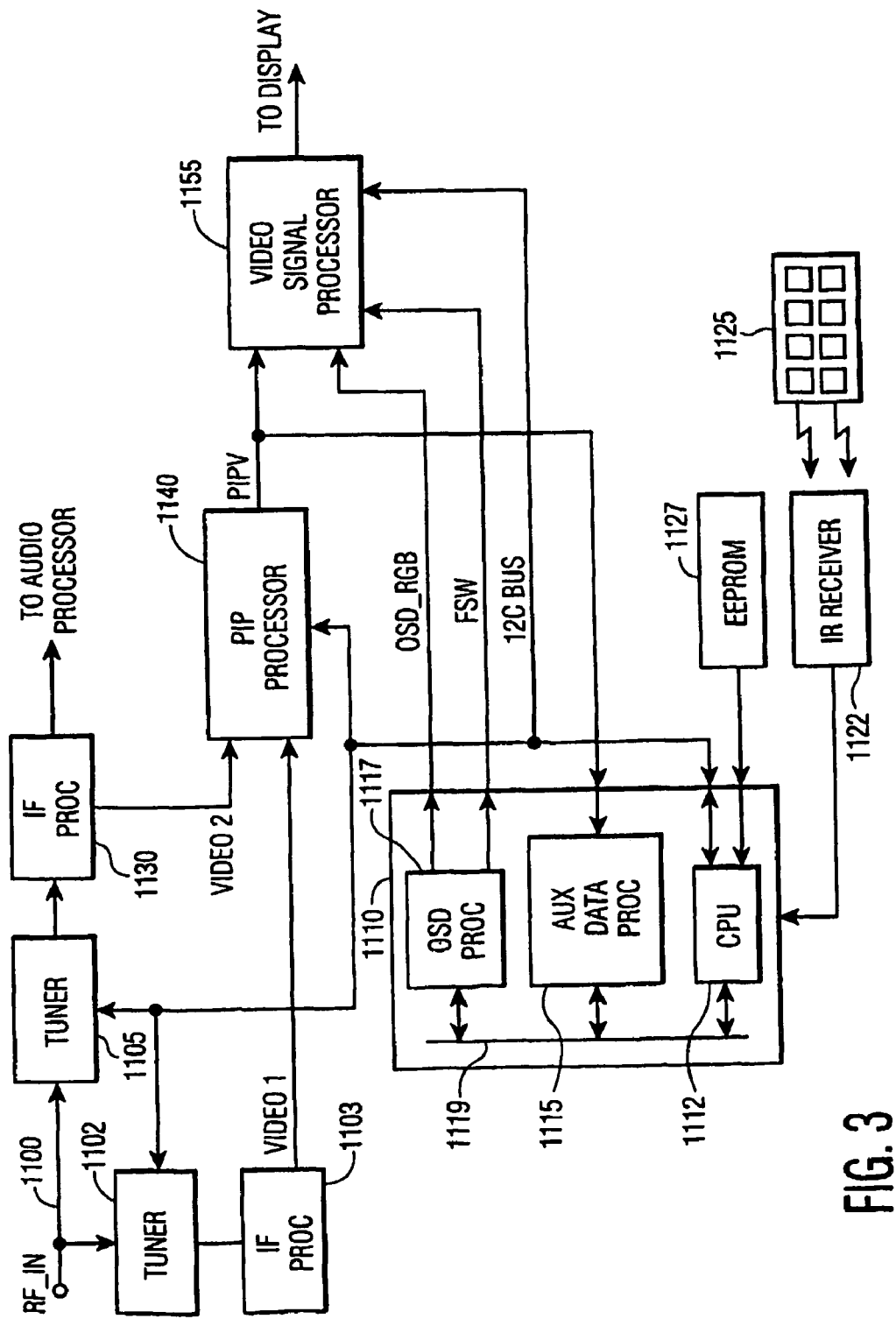
FIG. 3 illustrates a television apparatus according to the principles of the invention for sharing one set of channel changing keys.

FIG. 3 illustrates a television apparatus suitable for use with the method 200. The television apparatus shown in FIG. 3 has an input 1100 for receiving a television signal RF_IN at radio frequencies (RF). The signal RF_IN may be supplied from a source such as an antenna or a cable system. A tuner 1102 paired with an intermediate frequency (IF) processor 1103 and another tuner 1105 paired with another IF processor 1130 operate in a conventional manner for tuning and demodulating respective particular signals included in the signal RF_IN. The IF processors 1103 and 1130 respectively produce baseband video signals VIDEO 1 and VIDEO 2 representing the video program portions of the respectively tuned television signals from the tuners 1102 and 1105. Both IF processors also produce respective baseband audio signal, one of which is coupled to an audio processing section (not shown in FIG. 3) for further audio processing. Although FIG. 3 shows that the two tuners share the same input 1100, the television apparatus may include a second input, so that each tuner receives signals from a different input.

The television apparatus shown in FIG. 3 also includes a main microprocessor (uP) 1110 for controlling components of the television apparatus such as the tuners 1102 and 1105, a picture-in-picture processing unit 1140, and a video signal processor 1155. As used herein, the term "microprocessor" represents various devices including, but not limited to, microprocessors, microcomputers, microcontrollers, and controllers.

Microprocessor 1110 controls the system by sending and receiving both commands and data via serial data bus I²C BUS, which utilizes the well-known I²C serial data bus protocol. More specifically, a central processing unit (CPU) 1112 within the microprocessor 1110 executes control programs stored in a memory, such as a EEPROM 1127 shown in FIG. 3, in response to control signals (carrying user commands) provided by a user, e.g., via an infrared (IR) remote control 1125 and an IR receiver 1122. In the following discussion, the IR remote control 1125 illustratively is a type or remote control similar to the remote control 100 shown in FIG. 1.

For example, when a user has pressed the PIP key 131, the CPU 1112 checks whether a PIP window has been displayed upon receiving the control signal generated by the remote control 1125. If the PIP window has been displayed, the CPU proceeds to select a window, which is not currently selected, for future channel changing. For example, if the PIP window is selected, the CPU 1112 selects the main window. When the CPU 1112 receives a channel changing signal from the remote control 1125 generated by a user pressing one or more channel changing keys, for example, the channel up key 201, the CPU 1112 sends via I²C BUS a "change channel" command along with channel data to the tuner associated with the selected window. As a result, the tuner associated with the selected window tunes to the next channel in a channel scan list.

If the CPU 1112 upon receiving a PIP control signal determines that a PIP window has not been displayed, the CPU 1112 instructs a picture-in-picture (PIP) processor 1140 to activate a PIP window. At the same time, the CPU 1112 also selects the PIP window for future channel changing. Thus, one key in the remote control 100 can be used to display the PIP window and to select a window for channel changing. Advantageously, no additional key is needed for sharing the same set of channel changing keys.

The PIP processor 1140 receives VIDEO 1 and VIDEO 2 signal and produces a PIPV signal. When a PIP window is not displayed, the signal PIPV represents just the large picture. When a PIP window is displayed, the signal PIPV represents a large picture into which a small picture is inset. The PIP processor 1140 provides the described functionality in a conventional manner using features such as a video switch, analog-to-digital converter (ADC), RAM, and digital to analog converter (DAC).

The CPU 1112 controls functions included within the microprocessor 1110 via bus 1119. In particular, the CPU 1112 controls an auxiliary data processor 1115 and an on-screen display (OSD) processor 1117. The auxiliary data processor 1115 extracts auxiliary data such as data in an electronic program guide (EPG) from the video signal PIPV.

The OSD processor 1117 operates in a conventional manner to produce R, G, and B video signals OSD_RGB that, when coupled to a display device, will produce a displayed image representing on-screen display information such as graphics and/or text comprising an EPG or highlighting a selected window. The OSD processor 1117 also produces a control signal FSW, which is intended to control a fast switch for inserting signals OSD_RGB into a system's video output signal at times when an on-screen display is to be displayed.

Figure 4A:
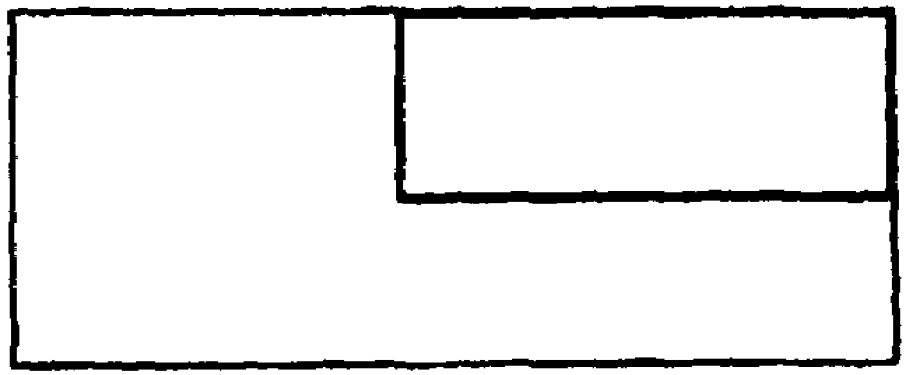
FIGS. 4A and 4B show the PIP and main windows are highlighted respectively when selected.
Figure 4B:
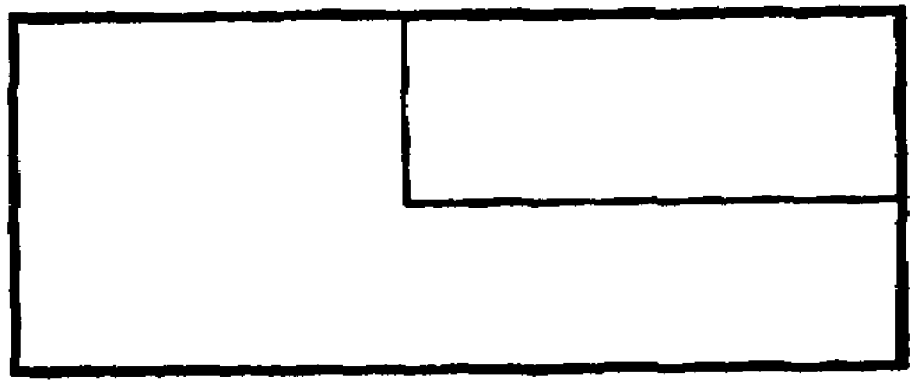

For example, if, upon receiving a PIP control signal from the remote control 1125, the CPU selects a PIP window for further channel changing, the CPU may highlight the PIP window such as a PIP window 410 in FIG. 4A. If the CPU 1112 selects a main window, the CPU 1112 may highlight the main window such as the main window 420 in FIG. 4B. In either case, the CPU 1112 enables the OSD processor 1117. In response, the OSD processor 1117 produces signals OSD_RGB representing the highlight information. The OSD processor 1117 also produces the signal FSW indicating when the highlight is to be displayed. Of course, the visual indication of a selected window is not limited to a highlight. The visual indication, for example, can be an icon such as a small circle located inside a selected window.

A video signal processor (VSP) 1155 receives the video signal PIPV from the PIP processor 1140 and performs conventional video signal processing functions, such as luma and chroma processing. Output signals produced by VSP 1155 are suitable for coupling to a display device, e.g., a kinescope or LCD devices (not shown in FIG. 3), for producing a displayed image. The VSP 1155 also includes a fast switch for coupling signals produced by the OSD processor 1117 to the output video signal path at times when graphics and/or text is to be included in the displayed image. The fast switch is controlled by the control signal FSW, which is generated by the OSD processor 1117 in the microprocessor 1110 at times when text and/or graphics are to be displayed.

For an indication of a selected window, such as a highlight, a symbol, text, or an icon, the display data is produced by the OSD processor 1117 and included in the output signal by VSP 1155 in response to the fast switch signal FSW. In this illustration, when the microprocessor 1110 receives a PIP control signal generated by the remote control 1125 when a user presses the PIP key, the microprocessor 1110 causes the OSD processor 1117 to produce the display indicating a selected window. The microprocessor 1110 then causes the VSP 1155 to combine the display data for indication from the OSD processor 1117 and the PIPV signal in response to signal FSW to produce a display including the indication.

Although illustrated as using the PIP key in a remote control for selecting a window so that one key can be saved in the remote control, a key in a front panel keyboard of the television apparatus can be used for selecting a window. Furthermore, the television apparatus may include a pointing device, such as a mouse, or a keyboard, both not shown in FIG. 3, for selecting a window for channel changing. The microprocessor 1110 detects activation of the pointing device, such as moving a mouse, and evaluates current cursor location information. When the microprocessor 1110 detects that a signal indicating a selection, such as clicking a mouse button, the microprocessor 1110 selects the window pointed by the mouse as the window for channel changing. A keyboard can be used to achieve the same purpose, using the arrow keys for moving the cursor and the return key for making a selection.

The control signals may also come from a front panel array (not shown) if necessary input mechanisms (such as buttons) are provided.

The television apparatus shown in FIG. 3 can be inside a television itself or in a set-top box. Set-top boxes are currently available for receiving digital satellite television broadcast, cable television broadcast, or community antenna service, or a combination thereof.

Although illustrated as one PIP window, the principles of invention can be extended to a television apparatus with two or more PIP windows. If each PIP window is associated with a different PIP key, one or more of the PIP keys can be used to invoke the associated PIP window and select one of the windows for channel changing. If only one PIP key is used for invoking all PIP windows, one at a time, the PIP key can be used to select one of the windows for channel changing after all PIP windows have been displayed. Preferably, a window is selected in a circular round-robin manner, i.e., all windows are arranged as a circular list and each time a selection signal is received, the television apparatus selects the window immediately next to the window currently selected. Of course, if a pointing device or a keyboard is provided, a user may select any window including the one that is currently selected.

In addition to a television apparatus supporting PIP capabilities, the principles of the invention can be extended to a television apparatus supporting either picture-and-picture (PAP) or picture-outside-picture (POP) capabilities. The selection criteria are similar to that of a television with PIP capabilities. For example, if a dedicated key is used for selecting a window for channel changing in a television with POP capabilities, a window is selected in a circular round-robin manner.

While this invention has been described with regard to a few presently preferred embodiments, those skilled in this art will readily appreciate that many alternative modes and embodiments can be carried out without departing from the spirit and scope of this invention.

What is claimed is:

1. A television apparatus, comprising:
   a display for enabling television signals to be displayed on respective first and second windows; and
   a processor for controlling the display control in response to user inputs from a remote control, wherein:
   if the first window is not displayed when a first key of the remote control is input, the processor causes the first window to be displayed and selected for channel changing, and in response to input of a second key of the remote control while the first window is selected for channel changing, the processor causes a channel displayed on the first window to be changed; and
   if the first window is displayed when the first key is input, the processor causes the second window to be selected for channel changing, and in response to input of the second key while the second window is selected for channel changing, the processor causes a channel displayed on the second window to be changed.

2. The television apparatus of claim 1, wherein the television signals displayed on the first and second windows are provided from first and second tuners, respectively.

3. The television apparatus of claim 1, wherein the first window is a picture-in-picture window.

4. The television apparatus of claim 3, wherein the first key is a picture-in-picture key.

5. The television apparatus of claim 4, wherein the second key is one of a channel up key and a channel down key.

6. The television apparatus of claim 4, wherein the second key is a number key.

7. The television apparatus of claim 4, wherein the second key is a go-back key for going back to a previous channel.

8. The television apparatus of claim 1, wherein when the second window is selected for channel changing, the processor causes a window other than the second window to be selected for channel changing in response to input of the first key.

9. The television apparatus of claim 1, further comprising a display for displaying the first and second windows.

10. The television apparatus of claim 1, wherein the first and second windows are picture-and-picture windows.

11. The television apparatus of claim 1, wherein one of the first and second windows is a picture-outside-picture window.

12. A method for sharing a channel changing key on a remote control for changing channels in a television apparatus supporting first and second windows for displaying television signals, the method comprising the steps of:

receiving a first control signal in response to user input of a first key of the remote control;

if the first window is not displayed when the first key is input, displaying the first window and selecting the first window for channel changing;

changing a channel displayed on the first window in response to input of the channel changing key while the first window is selected for channel changing;

if the first window is displayed when the first key is input, selecting the second window for channel changing; and changing a channel displayed on the second window in response to input of the channel changing key while the second window is selected for channel changing.

13. The method of claim 12, wherein the television signals displayed on the first and second windows are provided from first and second tuners, respectively.

14. The method of claim 13, wherein the first window is a picture-in-picture window.

15. The method of claim 13, wherein the first key is a picture-in-picture key for invoking a picture-in-picture feature of the television apparatus.

16. The method of claim 12, wherein when the second window is selected for channel changing, a window other than the second window is selected for channel changing in response to input of the first key.

17. The method of claim 12, wherein the channel changing key is one of a channel up key and a channel down key.

18. The method of claim 17, wherein the channel changing key is a number key.

19. The method of claim 12, wherein the channel changing key is a go-back key for going back to a previous channel.

* * * * *